United States Patent [19]
Kaub

[11] Patent Number: 5,708,201
[45] Date of Patent: Jan. 13, 1998

[54] FUEL DELIVERY MEASUREMENT SYSTEM WITH AUTOMATIC PUMP MATCHING

[75] Inventor: Peter Kaub, Shelby Township, Mich.

[73] Assignee: Pierburg Instruments, Inc., Clinton Township, Mich.

[21] Appl. No.: 653,345

[22] Filed: May 24, 1996

[51] Int. Cl.⁶ .................. G01M 15/00; G01L 3/26; F02M 37/00
[52] U.S. Cl. .................................. 73/119 A; 340/439
[58] Field of Search .................. 73/113, 114, 116, 73/117.2, 117.3, 118.1, 119 A, 196, 198, 199, 861.06; 340/439, 442, 450.2; 364/431.03, 431.04

[56] References Cited

U.S. PATENT DOCUMENTS

| | | | |
|---|---|---|---|
| 3,831,439 | 8/1974 | Konomi | 73/113 |
| 3,973,536 | 8/1976 | Zelders | 73/113 |
| 4,034,730 | 7/1977 | Ayres et al. | 123/139 AV |
| 4,054,054 | 10/1977 | Minks | 73/113 |
| 4,061,024 | 12/1977 | Erwin, Jr. | 73/114 |
| 4,079,623 | 3/1978 | Erwin, Jr. | 73/113 |
| 4,092,850 | 6/1978 | Erwin, Jr. | 73/113 |
| 4,206,634 | 6/1980 | Taylor et al. | 73/119 A |
| 4,248,194 | 2/1981 | Drutchas et al. | 123/497 |
| 4,304,125 | 12/1981 | Newman et al. | 73/119 A |
| 4,404,847 | 9/1983 | Carson | 73/119 A |
| 4,409,847 | 10/1983 | Magori | 73/113 |
| 4,446,727 | 5/1984 | Kurihara et al. | 73/113 |
| 4,479,465 | 10/1984 | Flynn | 73/119 A |
| 4,501,140 | 2/1985 | Nakagawa et al. | 73/113 |
| 4,539,965 | 9/1985 | Soltau | 73/119 A |
| 4,829,646 | 5/1989 | Cigolotti et al. | 73/119 A |
| 4,893,603 | 1/1990 | Siebels | 123/510 |
| 5,133,323 | 7/1992 | Treusch | 123/494 |
| 5,237,975 | 8/1993 | Betki et al. | 123/497 |
| 5,271,272 | 12/1993 | Hueftle et al. | 73/118.2 |
| 5,284,120 | 2/1994 | Fukushima et al. | 123/510 |
| 5,317,910 | 6/1994 | Steinbrenner et al. | 73/118.2 |
| 5,386,721 | 2/1995 | Aluizar | 73/116 |
| 5,445,018 | 8/1995 | Harpster | 73/118.2 |
| 5,507,266 | 4/1996 | Wright et al. | 123/497 |

*Primary Examiner*—George M. Dombroske
*Attorney, Agent, or Firm*—Young & Basile, P.C.

[57] ABSTRACT

A vehicular fuel flow measuring system derives a value for the consumption of fuel by an internal combustion engine operated with fuel from a tank containing a source thereof. The engine has a fuel introduction system with a first fuel pump having a suction input and a discharge output. The discharge output is coupled in fuel supply relationship with the engine for carrying out fuel combustion and recirculation functions. The fuel introduction system includes a first return conduit carrying return fuel for the recirculation function. The first return conduit has a first pressure regulating relief valve disposed therein. A second fuel pump is connectible between the first fuel pump and the fuel rail of the engine. The second fuel pump has a suction inlet and a discharge outlet for discharging pressurized fuel to the fuel rail of the engine. At least one flow measuring meter is connectible between the first fuel pump and the fuel rail of the engine. A mechanism is provided for matching the discharge pressure of the first and second fuel pumps. A control mechanism is provided for driving the second fuel pump at a flow rate substantially equal to a fuel flow rate of the first fuel pump.

20 Claims, 4 Drawing Sheets

FUEL DELIVERY MEASUREMENT SYSTEM WITH AUTOMATIC PUMP MATCHING

FIELD OF THE INVENTION

The present invention relates to a fuel delivery measurement device used for measuring fuel delivery to and fuel consumption of an internal combustion engine and, more particularly, to fuel delivery measurement devices suitable for an engine having a return fuel line, such as an electronic fuel injection gasoline engine or a diesel engine.

BACKGROUND OF THE INVENTION

Automotive vehicles typically include a fuel delivery system with a pump installed, either inside of the fuel storage tank, or externally with respect to the fuel storage tank, to pressurize the fuel. The fuel is supplied to the engine fuel rail. This fuel rail contains the fuel injectors and a relief regulator. The relief regulator maintains a required predetermined pressure at the fuel injectors and relieves all of the surplus fuel back to the storage tank. The flow rate and pressure setting can vary from vehicle to vehicle. Fuel pumps are designed to provide between 30% to 50% more fuel than the maximum amount of fuel consumed by the engine. If the fuel pump delivers more fuel than this, the relief regulator cannot maintain proper pressure due to internal restrictions. The fuel pump is matched to the engine size within a certain predetermined tolerance band. Fuel measuring systems typically create a subloop to allow the flow meter to measure only the consumed fuel. Typically, fuel measuring systems include a pump installed with fixed parameters with respect to pressure and flow rate. Due to the fixed pressure and flow rate parameters of the pump installed in typical fuel measuring systems, it is necessary to provide a very specific pump for each vehicle to be tested that substantially matches the fuel pump installed in the vehicle to be tested. This makes the measuring system very inflexible. A modification and recalibration is required when the vehicle type will change during a series of tests. Often, the type of fuel pump installed in a vehicle and the corresponding pressure and flow rate parameters of the installed fuel pump are not known, because prototype cars have to be tested.

As an alternative, to overcome the deficiencies of the fixed parameter pumps installed in fuel measuring systems, some fuel measuring systems have included a high flow pump. A relief regulator is installed in the measuring system to take over some fuel to be relieved. The adjustment is accomplished by trial and error in response to relieving the pressure from the fuel rail until the pressure starts to drop below the required pressure for the operating conditions to be measured. This method requires an experienced test operator in order to calibrate the relief regulator for proper testing, otherwise the combustion engine will be starving for fuel at high demand.

Another alternative uses a direct current motor control to vary the flow rate of a pump installed in a fuel measuring system. The set-point can be given by a computer with a look-up table. The parameters in the look-up table are found through various tests and calibrations. Unknown in-vehicle pumps could not be matched with a system of this type.

SUMMARY OF THE INVENTION

The present invention uses the concept of pump matching to measure the flow rate of the in-vehicle pump under normal operational conditions, i.e. the same delivery pressure, and to control the pump installed in the fuel measuring system to match the in-vehicle pump. This can require two additional flow meters in the preferred embodiment for measuring the two pump flow rates. A pilot controlled relief regulator assures that both pump pressures are the same. A first pump creates a first flow rate and that flow rate is measured by a first flow meter. A first pressure regulator or relief valve maintains a first pressure of the first pump according to the pressure at a pilot port. The ratio of the first pressure regulator is 1:1. The excess fuel which is not passing through the first flow meter is relieved back to the fuel storage tank. A second circulation loop includes a second pump creating a second flow rate, and that second flow rate is measured by a second flow meter. A second pressure regulator or relief valve is installed adjacent the engine to maintain the second pressure of the second pump. Excess fuel is returned to the inlet of the second pump. The second pressure at the second pressure regulator is fed back to the pilot port of the first pressure regulator to assure that the first pressure is equal to the second pressure. The signals of the first and second flow meters can be connected to a control circuit. The control circuit can drive the second pump to maintain the second flow meter reading identical to the first flow meter reading. The control circuit is not influenced by any fuel consumption, and the third flow meter only measures the actual consumption of fuel by the fuel injectors.

Pump matching according to the present invention can also be achieved with the use of a single flow meter with extended range to measure the pump flow rates and also the consumption of an idling engine. Several valves can be provided to allow the flow meter to be switched into different positions of the fluid circuit. This system also uses the pressure and flow pump matching as previously described above. The pump matching system according to the present invention with a single flow meter works as described below. By switching the valves, the single flow meter can be disposed in a first position, designated as the "learn-mode". The flow rate of the second pump is set by a computer or other control circuit to a default value to ensure that the first and second pressures are stable. The flow meter measures the flow rate of the unknown in-vehicle pump when in the learn-mode. This value is stored manually or can be stored electronically in a computer or other control circuit. By switching the valves, the single flow meter can be disposed in a second position designated as the "teach-mode". The operator, control circuit or computer manipulates the flow rate of the second pump until it matches the value measured in the learn-mode. Since both pump pressures are equalized, the pumps are now matched. The computer can keep this set value in memory or it can be stored manually or electronically in a control circuit. By switching the valves, the single flow meter can be disposed in a third position designated as the "run-mode". The fuel consumption of the engine can now be measured. For best accuracy of the matching, the engine should be running under the same engine operating conditions during the learn-mode and the teach-mode, such as by way of example and not limitation running the engine under warm, idle conditions during the learn and teach modes. This pump matching needs to be done only once for a new vehicle.

If it is desired for the fuel delivery measurement system according to the present invention with pump matching to be low cost and very compact, an external flow meter with a display can be installed into the supply line in the first position when the system is being connected to the vehicle to be tested. The flow rate of the first pump can then be measured. The second pump can be set to run at a preadjusted flow rate during measurement of the flow rate of the first pump. The external flow meter can then be switched into the engine supply line designated as the second position to run the engine under the same operating conditions in the teach mode. The use of quick disconnect couplings for the connections allows easy changed in the set up of the position of the flow meter. The second pump speed control is then adjusted, manually or automatically, to match the flow readings obtained when the flow meter was in the first position. The external flow meter can then be disconnected. The set value for the speed control can be stored manually or in a computer or other type of hardware. This procedure needs to be performed only once when setting up the measuring system, assuming the control keeps the pump flow substantially constant.

The fuel delivery measurement system according to the present invention allows a universal fuel measuring system to be built that suits all types of vehicles. One standard fuel pump can be used for a wide range of pressure and flow requirements. Simple, low cost flow meters can be used to quantify the pump flow rates either internally on a continuous basis, or externally once during set up. The addition of controllable valves or quick connect fittings suitably placed in the fluid circuit can reduce the need to a single flow meter. The additional cost of a more complex system enables the user to standardize on one type of measuring system, and also enables the user to reduce down time required to change the pumps used in existing fuel flow measuring systems and to accomplish the necessary calibrations. Errors that previously occurred by using a measuring system equipped with an improperly matched pump, and the resultant collection of unreliable test data for an extended period of time are also avoided with the present invention.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
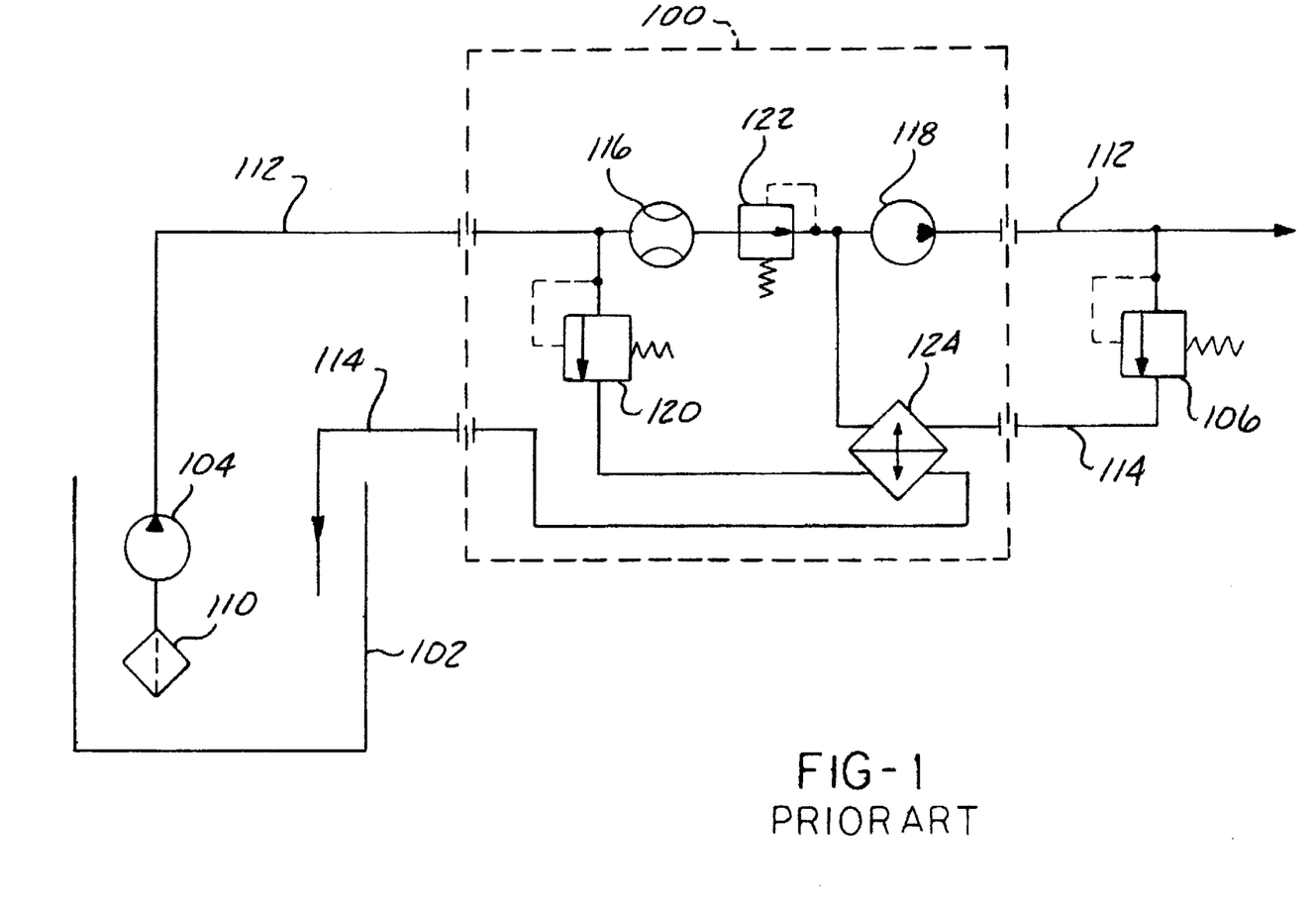
FIG. 1 is a simplified system diagram showing a prior art fuel consumption measuring device.

FIG. 1 is a simplified system diagram showing a typical conventional fuel delivery measurement device. In a conventional fuel delivery measurement device 100, fuel is pumped out of a fuel storage tank 102 by a pump 104, and has a predetermined pressure which is set by a relief valve 106. The conduit 108 is connected to a fuel rail (not shown) for an engine that supplies the fuel injectors for the engine.

A filter 110 may be provided on the suction side or the discharge side of the pump 104. Prior to insertion of the conventional fuel delivery device 100 into the supply conduit 112 and the return conduit 114, the relief valve 106 is connected to the fuel storage tank 102 by return conduit 114. After insertion of the conventional fuel delivery measurement device 100 into the supply conduit 112 and return conduit 114, a flow meter 116 and a second pump 118 is inserted in the supply conduit 112 between the first pump 104 and the conduit 108 supplying the engine fuel rail. The first relief valve 106 is diverted from its normal discharge into the fuel storage tank 102, and is connected to the suction side of the second pump 118. A second relief valve 120 is connected to the supply conduit 112 between the first pump 104 and the flow meter 116 for diverting excess fuel flow back to the storage tank 102 before passing through the flow meter 116. This prior art measurement system requires the second pump 118 to be specifically matched to the first pump 104 installed in the vehicle to be tested, resulting in an inflexible system requiring excessive modification and recalibration when different vehicle types are being tested on a random basis. As is conventional, a heat exchanger 124 can be provided in the return line 114. The heat exchanger 124 can be a fluid to fluid heat exchanger to cool the fuel recirculated by the second pump 118 in the second fluid loop with the fuel recirculated by the first pump 104 in the first fluid loop. A pressure reducer 122 is typically provided between the flow meter 116 and the inlet of the second pump 118 to reduce the fuel pressure. Conventionally, the fuel pressure is reduced by the pressure reducer 122 to a range of between 2 to 5 pounds per square inch (psi). It should be recognized that the pressure reducer 122 could be replaced with a tank open to atmospheric pressure without affecting the function of the flow measuring device. As is also conventional, the heat exchanger 124 may be provided to cool the fuel returning from relief valve 106 with fuel flow from relief valve 120.

Figure 2:
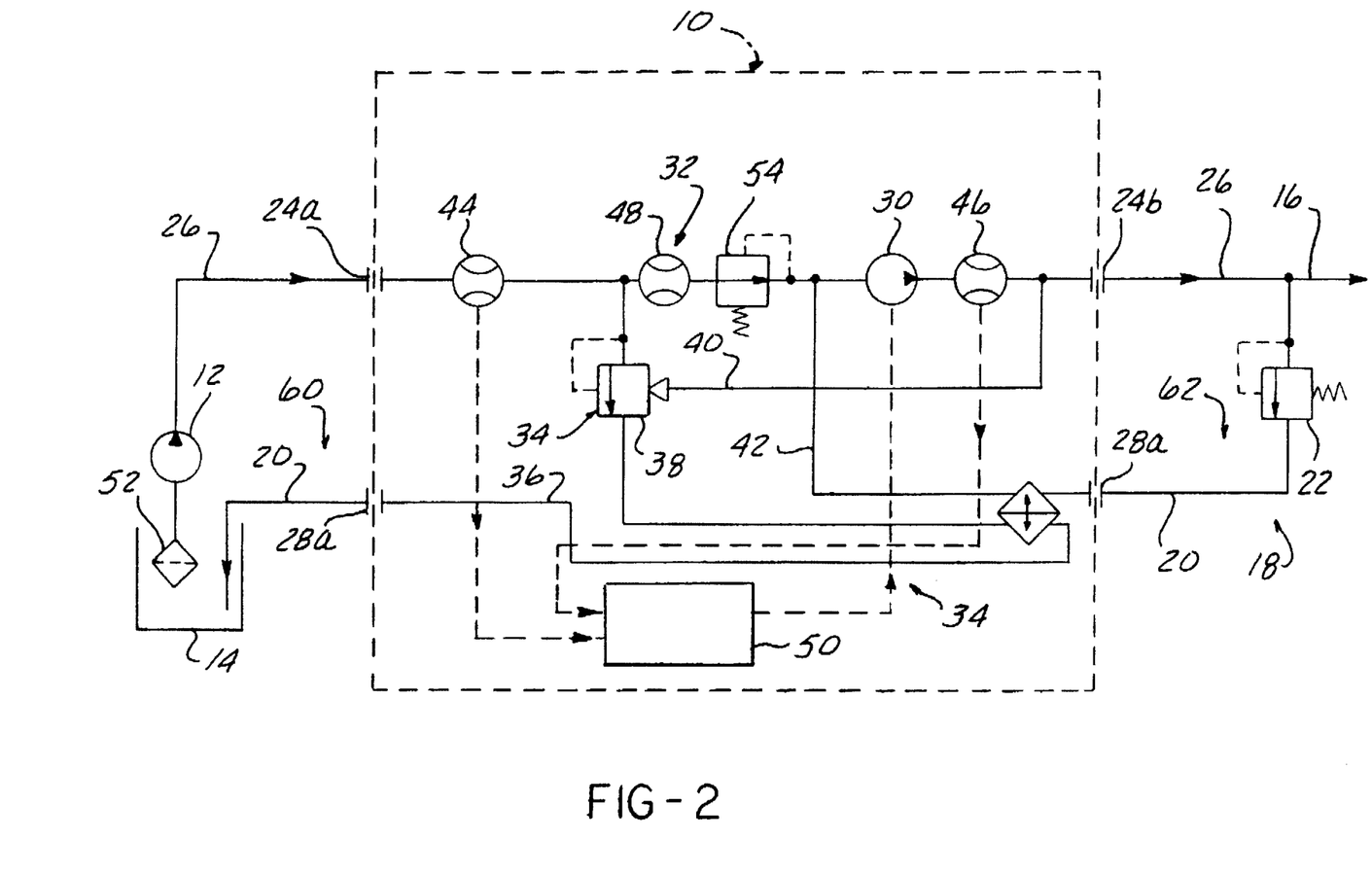
FIG. 2 is a simplified system diagram showing a first embodiment of a fuel delivery measurement system according to the present invention.

Referring now to FIG. 2, a simplified system diagram illustrates a fuel delivery measurement device 10 according to the present invention. The fuel delivery measurement apparatus 10 according to the present invention is used for measuring fuel delivered to a fuel injection system having a first fuel pump 12 drawing fuel from a storage tank 14 for pressurized discharge to a fuel rail connected to conduit 16 supplying fuel to at least one fuel injector of an internal combustion engine. A filter 52 may be provided on the suction side or the discharge side of the pump 12. An excess fuel return system 18 includes a first fuel return conduit 20 with a first pressure regulating relief valve 22 disposed between the pressurized discharge of the first fuel pump 12 and the storage tank 14. Preferably, the fuel delivery measurement apparatus 10 according to the present invention is releasibly connectible to a standard conventional vehicle fuel delivery system by suitable connectors, such as quick couplings or the like, matable with separable halves, 24a and 24b, of a first connector disposed in the pressurized discharge conduit 26 of the first fuel pump 12 and matable with the separable halves 28a and 28b of a second connector disposed in the first fuel return conduit 20. Preferably, complementary connector halves are provided as part of the fuel delivery measurement apparatus 10 to allow connection of the fluid circuit to the standard conventional fuel delivery system of the vehicle as illustrated schematically in FIG. 2.

The fuel delivery measurement apparatus 10 includes a second fuel pump 30 connectible between the first fuel pump 12 and the conduit 16 supplying fuel to the fuel rail of the engine. The second fuel pump 30 has a suction inlet in fluid communication with the pressurized discharge of the first fuel pump 12 and a discharge outlet for discharging pressurized fuel to the conduit 16 supplying fuel to the fuel rail of the engine. Fuel flow measuring means 32 is connectible between the first fuel pump 12 and the conduit 16 supplying fuel to the fuel rail of the engine for measuring fuel flow between the first fuel pump 12 and the fuel rail. Discharge pressure matching means 34 is provided for matching discharge pressure of the first and second fuel pumps, 12 and 30 respectively.

The discharge pressure matching means 34 can include a second return conduit 36 connectible in fluid communication between the pressurized discharge of the first fuel pump 12 and the storage tank 14 for returning excess fuel to the tank 14. A pilot-operated, relief valve 38 is positionable in the second return conduit 36 for regulating a second pressure. A pilot conduit 40 is connectible in fluid communication between the pressurized outlet of the second fuel pump 30 and the pilot-operated relief valve 38 for controlling and maintaining a 1:1 ratio between the first discharge pressure regulated by the first relief valve 22 and the second discharge pressure regulated by the pilot-operated relief valve 38. A diverting conduit 42 is connectible with the first return conduit 20 between the first pressure regulating relief valve 22 and the storage tank 14 for diverting all return fuel flow from the first pressure regulating relief valve 22 to the suction inlet of the second fuel pump 30. A pressure reducer 54 is provided between the first pump 12 discharge outlet and the second pump 30 suction inlet as is conventional. The pressure reduces is typically positioned between a flow meter 48 and the connection of the diverting conduit 42. The pressure reducer 54 conventionally reduces the pressure to a range of between 2 to 5 pounds per square inch (psi).

The measuring means 32 can include a first flow measuring meter 44 connectible between the pressurized discharge of the first fuel pump 12 and the conduit 16 supplying fuel to the fuel rail of the engine for measuring fuel flow from the first fuel pump 12. The measuring means 32 can also include a second flow measuring meter 46 connectible between the pressurized discharge of the second pump 30 and the conduit 16 supplying fuel to the fuel rail of the engine for measuring fuel flow from the second fuel pump 30. The measuring means 32 can also include a third flow measuring meter 48 connectible between the pressurized discharge of the first pump 12 downstream of the connection for the fuel return conduit for the first fuel circulating loop 60 and the suction inlet of the second pump 30 upstream of the pressure reducer 54 for measuring fuel consumption of the engine during testing. The second pump 30 and second relief valve 22 define a second fuel circulating loop 62.

Figure 3:
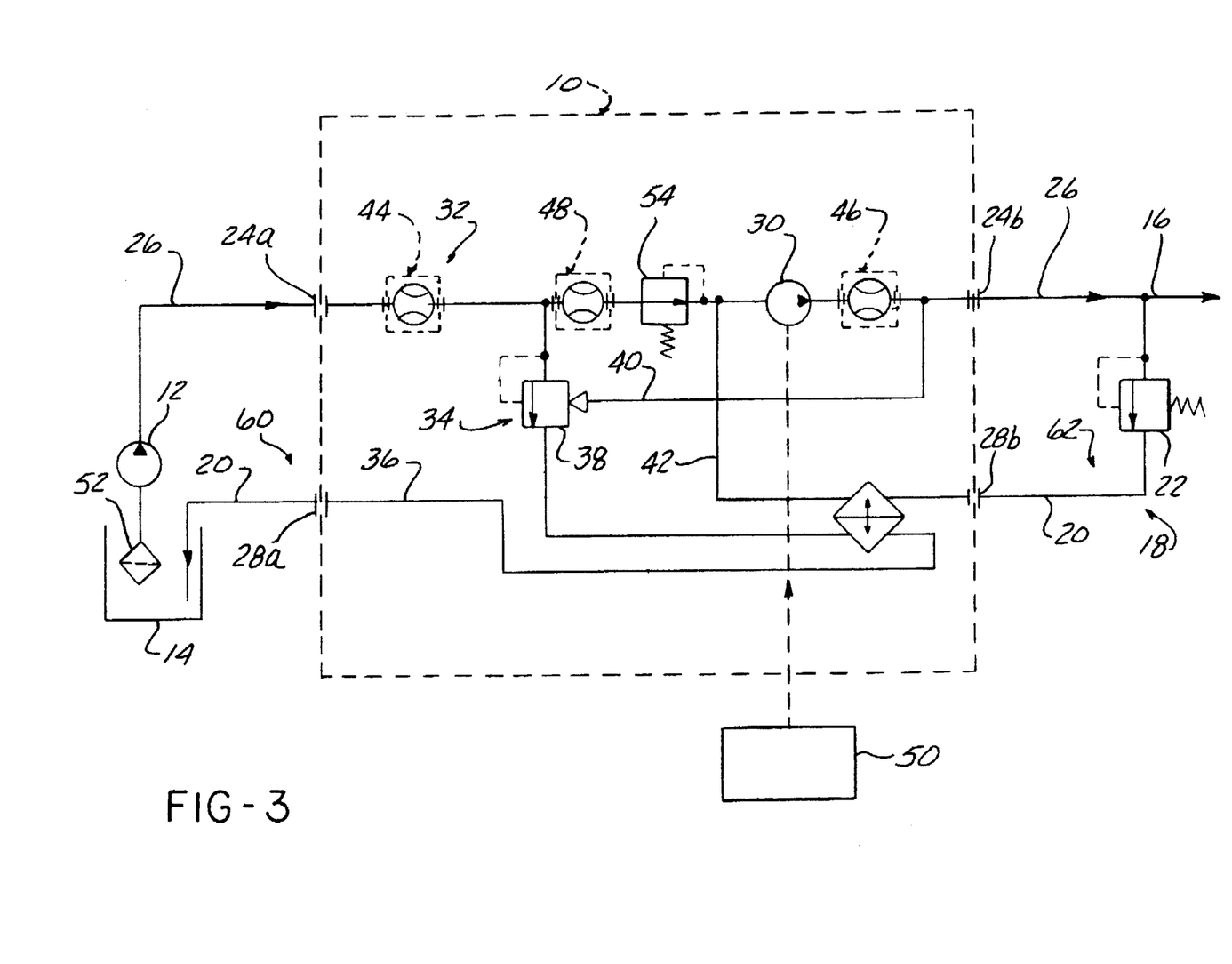
FIG. 3 is a simplified system diagram showing a second embodiment of a fuel delivery measurement system according to the present invention.

Referring now to FIG. 3, the measuring means 32 can include at least one flow measuring meter selectively connectible in first, second and third positions by any suitable means, such as by physical connection, disconnection, relocation, reconnection or an appropriate valve system. When the one flow measuring meter is in the first position illustrated in phantom box at 44, the meter is in fluid communication between the pressurized discharge of the first pump 12 and the conduit 16 supplying fuel to the fuel rail of the engine for measuring fuel flow from the first fuel pump 12 during a "learn-mode" of operation. When the flow measuring meter is in the second position illustrated in phantom box at 46, the meter is in fluid communication between the pressurized discharge of the second pump 30 and the conduit 16 supplying fuel to the fuel rail of the engine for measuring fuel flow from the second fuel pump 30 during a "teach-mode" of operation. When the one flow measuring meter is in the third position illustrated at 48, the meter is in fluid communication between the pressurized discharge of the first pump 12 and the suction inlet of the second fuel pump 30 for measuring fuel consumption of the engine during a "test run mode" of operation. During the learn-mode, control means 50 is learning the flow rate of the first fuel pump 12 while the flow rate of the second fuel pump 30 is held at a constant predetermined value. During the teach-mode, the control means 50 is setting the flow rate of the second fuel pump 30 to be substantially equal to the flow rate of the first fuel pump 12 that was determined during the learn-mode operation. During the test-run mode, the single flow measuring meter is in a position to directly measure only the consumed fuels flow, since the pressure and flow rate of the first pump 12 and the second pump 30 are matched.

If first, second and third flow measuring meters are provided at locations 44, 46 and 48 respectively, the control means 50 can be operated continuously as illustrated in FIG. 2 to monitor the flow rate of fuel from the first fuel pump 12 with the first flow measuring meter at location 44, while simultaneously measuring the fuel flow from the second fuel pump 30 with the second flow measuring meter at location 46 to maintain the flow rates of the first and second fuel pumps, 12 and 30 respectively, substantially equal to one another while the pilot-operated relief valve 38 maintains the first and second pressures from the first and second pumps, 12 and 30 respectively, substantially equal to one another. The control means 50 can also continuously monitor the third meter at location 48 to directly measure the fuel consumption of the engine.

Figure 4:
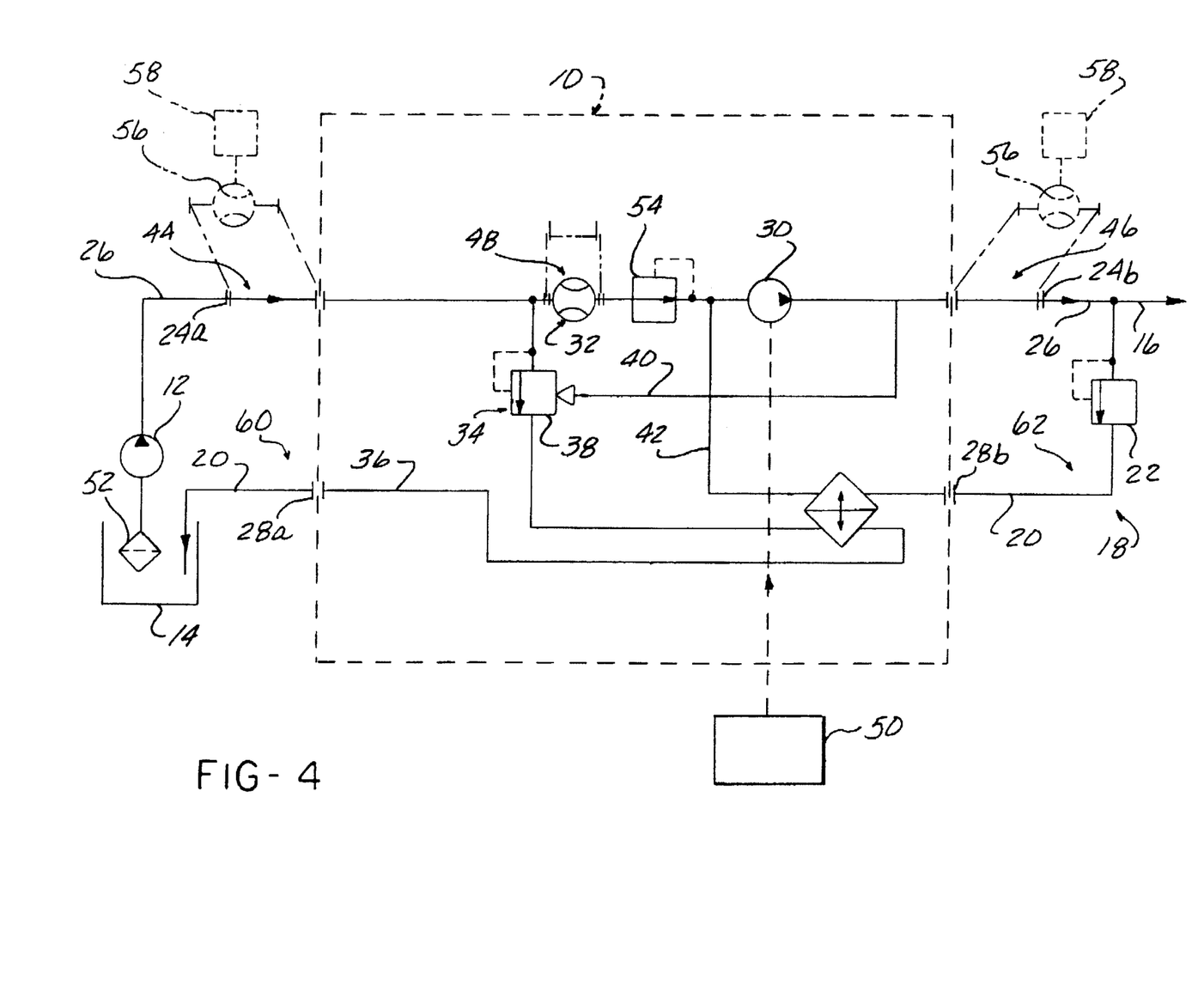
FIG. 4 is a simplified system diagram showing a third embodiment of a fuel delivery measurement system according to the present invention.

Referring now to FIG. 4, the measuring means 32 can include an external fuel flow meter selectively positioned in any one of the three locations identified as 44, 46 and 48 by any suitable means, such as releasible mechanical connections, relocatable connections, or appropriate valve fluid circuit configurations. The external fuel flow meter 56 can include an external readout 58 operably connected to a flow meter 56 connected to the fluid circuit in a position corresponding to 44 in FIG. 4 in order to operate in the learn-mode to measure the flow rate of the first fuel pump 12, while the flow rate of the second fuel pump 30 is held at a predetermined value by a computer or other controller in order to ensure that the discharge pressure of the first pump 12 and the discharge pressure of the second pump 30 are stable with respect to one another. In this configuration, the flow meter 56 is measuring the flow rate of the first fuel pump 12. After determining the flow rate of the first fuel pump 12, the value or data can be read by an operator looking at the external readout 58 and stored in a log or memorized by the operator, or can be automatically processed by a controller or central processing unit connected to memory for storage of fuel pump flow rate values based on input criteria defining a vehicle to be tested in a suitable look-up data table which can define part of the control means 50. By suitable switching of the valves in the fluid circuit, or physically relocating the single flow meter into the position illustrated at 46, the operator can manually manipulate the controls for the second pump 30 until the external readout 58 matches the previous reading or the control means 50 can automatically operate through the central processing unit, connected memory and fuel pump flow rate values stored in the data look-up table to modify the flow rate of the second fuel pump 30 until it matches the value measured in the learn-mode. This configuration is referred to as the teach-mode. Since the pressures are being maintained substantially identical to one another by pilot-operated relief valve 38, the first pump 12 and second pump 30 are now matching. The computer or other intelligent hardware can keep this set value in memory as part of the data look-up table. The single flow meter 56 can then be switched into the position indicated at 48 by appropriate physical relocation and connection or by appropriate valve switching, to place the single flow meter 56 in the run-mode, or a permanent flow meter can be installed at position 48. The fuel consumption of the engine can now be measured. For best accuracy of the matching of the first and second pumps, the engine should be running under the same engine operating conditions or parameters during the learn-mode and the teach-mode. The pump matching according to this configuration needs to be done only once for each new vehicle configuration.

As illustrated in FIG. 4, the fuel measuring system 10 according to the present invention can include a single internal flow meter at position 48 for measuring fuel consumption of the engine and a single external flow meter 56 with external readout 58 selectively positionable at locations 44 and 46 can be provided for the learn mode and teach mode. When the system is connected to the vehicle, an external flow meter 56 with a display 58 can be temporarily installed into the pressurized discharge conduit 26 outside of the system. The flow rate of the first pump 12 can then be measured. During the measurement of the flow rate for the first pump 12, the second pump is set to run at a predetermined flow rate. The external flow meter 56 can then be temporarily switched into the engine supply line indicated at 46 outside of the system. This can be accomplished by using quick disconnect coupling members for the interconnections allowing for easy changes in the set-up. The operator or the control means 50 can now adjust the speed of the second pump 30 in order to match the flow readings obtained when the flow meter 56 was in the first position illustrated at 44. The external flow meter can then be disconnected. The set value for the speed control can be stored manually or in a computer or other type of hardware. This procedure needs to be performed only once when setting up the measuring system, assuming the control means 50 can maintain the pump flow at a substantially constant rate.

The present invention encompasses a method of measuring fuel flow delivered to an internal combustion engine having a fuel pump 12 with a suction input in fluid communication with a fuel storage tank 14 and a pressurized discharge output in fluid communication with a conduit 16 supplying fuel to a fuel rail connected to at least one fuel injector of an internal combustion engine. The excess fuel return conduit is in fluid communication with the pressurized discharge output and the fuel storage tank 14. A return conduit 20 has a pressure regulating relief valve 22 disposed therein. The method includes the steps of connecting a second fuel pump 30 between the first fuel pump 12 and the conduit 16 supplying the fuel rail with fuel. The second pump 30 has a suction inlet and a discharge outlet for discharging pressurized fuel to the fuel rail. Fuel flow is measured between the first fuel pump 12 and the conduit 16 supplying fuel to the fuel rail.

The discharge pressure of the first and second fuel pumps, 12 and 30 respectively, are matched to one another. The discharge pressure matching step can also include the steps of returning excess fuel to the tank 14 through a second return conduit 36 connectible in fluid communication between the pressurized discharge of the first fuel pump 12 and the storage tank 14, regulating a second pressure with a pilot-operated relief valve 38 positionable in the second return conduit 36, and connecting a pilot conduit 40 in fluid communication between the pressurized outlet of the second fuel pump 30 and the pilot-operated relief valve 38. The measuring step can also include the step of measuring fuel flow from the first fuel pump 12 with a first flow measuring meter connectible between the pressurized discharge of the first pump 12 and the conduit 16 supplying fuel to the fuel rail of the engine or with the first flow measuring meter permanently positioned at the location illustrated at 44. The measuring step can also include the step of measuring fuel flow from the second fuel pump 30 with a first flow measuring meter relocatable to be connectible between the pressurized discharge of the second fuel pump 30 and the conduit 16 supplying fuel to the fuel rail of the engine or with a second flow measuring meter permanently positioned at the location illustrated at 46. The measuring step can also include the measuring step of measuring fuel consumption of the engine during testing with a first flow measuring meter relocatable to be connectible between the pressurized discharge of the first pump 12 and the suction inlet of the second fuel pump 30 or with a third flow measuring meter permanently positioned at the location illustrated at 48.

The measuring step can also include the steps of selectively connecting at least one flow measuring meter in first, second and third positions, such that when in the first position, the meter is in fluid communication between the pressurized discharge of the first pump 12 and the conduit 16 supplying fuel to the fuel rail of the engine for measuring fuel flow from the first fuel pump 12 during a learn-mode of operation. When the single flow measuring meter is in the second position, the meter is in fluid communication between the pressurized discharge of the second pump 30 and the conduit 16 supplying fuel to the fuel rail of the engine for measuring fuel flow from the second fuel pump 30 during a teach-mode of operation. When the single fuel measuring meter is in the third position, the meter is in fluid communication between the pressurized discharge of the first pump 12 and the suction inlet of the second fuel pump 30 for directly measuring the actual fuel consumption of the engine during a test-run mode of operation or the first flow measuring meter can be an external meter with readout movable between the positions illustrated at 44 and 46 of FIG. 4 and a second flow measuring meter can be permanently located at the position illustrated at 48.

If first, second and third flow measuring meters are provided, the measuring step can include the steps of measuring fuel flow from the first fuel pump 12 with the first flow measuring meter in fluid communication between the pressurized discharge of the first fuel pump 12 and the conduit 16 supplying fuel to the fuel rail of the engine, measuring the fuel flow from the second fuel pump 30 with the second flow measuring meter in fluid communication between the pressurized discharge of the second fuel pump 30 and the conduit 16 supplying fuel to the fuel rail of the engine, and measuring fuel consumption of the engine with the third meter in fluid communication between the pressurized discharge of the first pump 12 and the suction inlet of the second pump 30 as illustrated in FIG. 2. The method of the present invention can also include the step of controllably driving the second fuel pump 30 at a fuel flow rate substantially equal to a fuel flow rate of the first fuel pump 12. The driving step can also include the steps of controlling the second fuel pump 30 with a central processing unit to provide a fuel flow rate from the second pump 30 substantially equal to the fuel flow rate from the first fuel pump 12. The central processing unit can be connected to memory for storage of fuel pump flow rate values based on input criteria defining a vehicle to be tested in a data look-up table, such that a signal can be generated and sent to the central processing unit during the measuring step corresponding to a measured fuel flow rate of the first pump 12 for identifying a vehicle to be tested.

It should be recognized based on the disclosure of the present invention set forth in detail above that certain modifications may be made to the present invention without departing from the spirit and scope thereof. By way of example, and not limitation, it is recognized that the first pump 12 and second pump 30 can be matched in both pressure and flow rate with the fluid circuit disclosed even if the flow meters are positioned in the fuel return lines of the first relief valve 22 and the second relief valve 38 from the positions illustrated at 44 and 46, since the return flow of the pumps will be substantially equal to one another when the pumps are matched, provided that allowances are made for differences in return pressure and temperatures, if any, between the first and second fuel loops 60 and 62.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel delivery measurement apparatus for a fuel injection system having a first fuel pump with a first motive power source, said first fuel pump drawing fuel from a storage tank for pressurized discharge to a fuel rail supplying fuel to at least one fuel injector of an internal combustion engine and an excess fuel return system having a first fuel return conduit with a first pressure regulating relief valve disposed between said pressurized discharge of said first fuel pump and said storage tank comprising:

a second fuel pump having a second motive power source separate and independent of said first motive power source, said second fuel pump connectible between said first fuel pump and said fuel rail, said second fuel pump having a suction inlet and a discharge outlet for discharging pressurized fuel to said fuel rail;

first means for measuring fuel flow connectible between said first fuel pump and said fuel rail; and means for matching discharge pressure of said first and second fuel pumps.

2. The apparatus of claim 1 wherein said discharge pressure matching means further comprises:

a second return conduit connectible in fluid communication between said pressurized discharge of said first fuel pump and said storage tank for returning excess fuel to said tank;

a pilot-operated, second pressure regulating relief valve positionable in said second return conduit; and a pilot conduit connectible in fluid communication between said pressurized outlet of said second fuel pump and said pilot-operated, second pressure regulating relief valve.

3. The apparatus of claim 1 wherein said first measuring means further comprises:

a first flow measuring meter connectible between said pressurized discharge of said first pump and said fuel rail of said engine for measuring fuel flow from said first fuel pump.

4. The apparatus of claim 1 wherein said first measuring means further comprises:

a first flow measuring meter connectible between said pressurized discharge of said second pump and said fuel rail of said engine for measuring fuel flow from said second fuel pump.

5. The apparatus of claim 1 wherein said first measuring means further comprises:

a first flow measuring meter connectible between said pressurized discharge of said first pump and said suction inlet of said second fuel pump for measuring fuel consumption of the engine during testing.

6. The apparatus of claim 1 wherein said first measuring means further comprises:

a first flow measuring meter in fluid communication between said pressurized discharge of said first pump and said fuel rail of said engine for measuring fuel flow from said first fuel pump;

a second flow measuring meter in fluid communication between said pressurized discharge of said second pump and said fuel rail of said engine for measuring fuel flow from said second fuel pump; and a third meter in fluid communication between said pressurized discharge of said first pump and said suction inlet of said second fuel pump for measuring fuel consumption of the engine.

7. The apparatus of claim 1 further comprising:

control means for driving said second fuel pump at a fuel flow rate substantially equal to a fuel flow rate of said first fuel pump.

8. The apparatus of claim 1 further comprising:

a central processing unit for controlling said second fuel pump to provide a fuel flow rate substantially equal to said first fuel pump, said central processing unit connected to memory for storage of fuel pump flow rate values based on input criteria defining a vehicle to be tested in a look up table; and said first means for measuring flow generating a signal to said central processing unit corresponding to a measured fuel flow rate for identifying a vehicle to be tested.

9. A fuel delivery measurement apparatus for a fuel injection system having a first fuel pump drawing fuel from a storage tank for pressurized discharge to a fuel rail supplying fuel to at least one fuel injector of an internal combustion engine and an excess fuel return system having a first fuel return conduit with a first pressure regulating relief valve disposed between said pressurized discharge of said first fuel pump and said storage tank comprising:

a second fuel pump connectible between said first fuel pump and said fuel rail, said second fuel pump having a suction inlet and a discharge outlet for discharging pressurized fuel to said fuel rail;

first means for measuring fuel flow connectible between said first fuel pump and said fuel rail, wherein said first measuring means includes at least one flow measuring meter selectively connectible in first, second and third positions, such that when in said first position, said meter is in fluid communication between said pressurized discharge of said first pump and said fuel rail of said engine for measuring fuel flow from said first fuel pump during a learn-mode of operation, when in said second position, said meter is in fluid communication between said pressurized discharge of said second pump and said fuel rail of said engine for measuring fuel flow from said second fuel pump during a teach-mode of operation, and when in said third position, said meter is in fluid communication between said pressurized discharge of said first pump and said suction inlet of said second fuel pump for measuring fuel consumption of the engine during a test-run mode of operation; and means for matching discharge pressure of said first and second fuel pumps.

10. A system for deriving a value for the consumption of fuel by an internal combustion engine operated with fuel from a tank contained source thereof, said engine having a fuel introduction system with a first fuel pump having a suction input and a discharge output, said discharge output being coupled in fuel supply relationship with said engine for carrying out fuel combustion and recirculation functions, said fuel introduction system including a first return conduit carrying return fuel for said recirculation function, said first return conduit having a first pressure regulating relief valve disposed therein, comprising:

a second fuel pump connectible between said first fuel pump and said engine, said second fuel pump having a suction inlet and a pressurized outlet;

a second return conduit connectible between said first and second fuel pumps for carrying return fuel for said recirculating function from said discharge output of said first fuel pump to said tank;

a pilot-operated, second pressure regulating relief valve positionable in said second return conduit;

a pilot conduit connectible to place said pressurized outlet of said second fuel pump in fluid communication with said pilot-operated, second pressure regulating relief valve;

a diverting conduit connectible with said first fuel return conduit between said pressure regulating relief valve and said tank for diverting all return fuel flow from said first pressure regulating relief valve to said suction inlet of said second fuel pump; and control means for driving said second fuel pump at a fuel flow rate substantially equal to a fuel flow rate of said first fuel pump.

11. A method of measuring fuel flow delivered to an internal combustion engine having a first fuel pump with a first motive power source, a suction input in fluid communication with a fuel storage tank and a pressurized discharge output in fluid communication with a fuel rail supplying fuel to at least one fuel injector of said internal combustion engine, and an excess fuel return conduit in fluid communication with said pressurized discharge output and said fuel storage tank, said return conduit having a pressure regulating relief valve disposed therein, said method comprising the steps of:

connecting a second fuel pump between said first fuel pump and said fuel rail, said second fuel pump having a second motive power source separate and independent of said first motive power source, a suction inlet and a discharge outlet for discharging pressurized fuel to said fuel rail;

measuring fuel flow between said first fuel pump and said fuel rail; and matching discharge pressure of said first and second fuel pumps.

12. The method of claim 11 wherein said discharge pressure matching step further comprises the steps of:

returning excess fuel to said tank through a second return conduit connectible in fluid communication between said pressurized discharge of said first fuel pump and said storage tank;

regulating a second pressure with a pilot-operated relief valve positionable in said second return conduit; and connecting a pilot conduit in fluid communication between said pressurized outlet of said second fuel pump and said pilot-operated, relief valve.

13. The method of claim 11 wherein said measuring step further comprises the step of:

measuring fuel flow from said first fuel pump with a first flow measuring meter connectible between said pressurized discharge of said first pump and said fuel rail of said engine.

14. The method of claim 11 wherein said measuring step further comprises the step of:

measuring fuel flow from said second fuel pump with a first flow measuring meter connectible between said pressurized discharge of said second pump and said fuel rail of said engine.

15. The method of claim 11 wherein said measuring step further comprises the step of:

measuring fuel consumption of the engine during testing with a first flow measuring meter connectible between said pressurized discharge of said first pump and said suction inlet of said second fuel pump.

16. The method of claim 11 wherein said measuring step further comprises the steps of:

measuring fuel flow from said first fuel pump with a first flow measuring meter in fluid communication between said pressurized discharge of said first pump and said fuel rail of said engine;

measuring fuel flow from said second fuel pump with a second flow measuring meter in fluid communication between said pressurized discharge of said second pump and said fuel rail of said engine; and measuring fuel consumption of the engine with a third meter in fluid communication between said pressurized discharge of said first pump and said suction inlet of said second fuel pump.

17. The method of claim 11 further comprising the step of:

controllably driving said second fuel pump at a fuel flow rate substantially equal to a fuel flow rate of said first fuel pump.

18. The method of claim 11 further comprising the step of:

controlling said second fuel pump with a central processing unit to provide a fuel flow rate substantially equal to said first fuel pump, said central processing unit connected to memory for storage of fuel pump flow rate values based on input criteria defining a vehicle to be tested in a look up table; and generating a signal to said central processing unit during said measuring step corresponding to a measured fuel flow rate for identifying a vehicle to be tested.

19. A method of measuring fuel flow delivered to an internal combustion engine having a first fuel pump with a suction input in fluid communication with a fuel storage tank and a pressurized discharge output in fluid communication with a fuel rail supplying fuel to at least one fuel injector of said internal combustion engine, and an excess fuel return conduit in fluid communication with said pressurized discharge output and said fuel storage tank, said return conduit having a pressure regulating relief valve disposed therein, said method comprising the steps of:

connecting a second fuel pump between said first fuel pump and said fuel rail, said second fuel pump having a suction inlet and a discharge outlet for discharging pressurized fuel to said fuel rail;

measuring fuel flow between said first fuel pump and said fuel rail, wherein said measuring step further includes the step of selectively connecting at least one flow measuring meter in first, second and third positions, such that when in said first position, said meter is in fluid communication between said pressurized discharge of said first pump and said fuel rail of said engine for measuring fuel flow from said first fuel pump during a learn-mode of operation, when in said second position, said meter is in fluid communication between said pressurized discharge of said second pump and said fuel rail of said engine for measuring fuel flow from said second fuel pump during a teach-mode of operation, and when in said third position, said meter is in fluid communication between said pressurized discharge of said first pump and said suction inlet of said second fuel pump for measuring fuel consumption of the engine during a test-run mode of operation; and matching discharge pressure of said first and second fuel pumps.

20. A method for deriving a value for the consumption of fuel by an internal combustion engine operated with fuel from a tank contained source thereof, said engine having a fuel introduction system with a first fuel pump having a suction input and a discharge output, said discharge output being coupled in fuel supply relationship with said engine for carrying out fuel combustion and recirculation functions, said fuel introduction system including a first return conduit carrying return fuel for said recirculation function, said first return conduit having a first pressure regulating relief valve disposed therein, comprising the steps of:

connecting a second fuel pump between said first fuel pump and said engine, said second fuel pump having a suction inlet and a pressurized outlet;

connecting a second return conduit between said first and second fuel pumps for carrying return fuel for said recirculating function from said discharge output of said first fuel pump to said tank;

regulating a second pressure with a pilot-operated, relief valve positionable in said second return conduit;

connecting a pilot conduit in fluid communication with said pressurized outlet of said second fuel pump and said pilot-operated, relief valve;

connecting a diverting conduit in fluid communication with said first return conduit between said pressure regulating valve and said tank for diverting all return fuel flow from said first pressure regulating relief valve to said suction inlet of said second fuel pump; and driving said second fuel pump at a fuel flow rate substantially equal to a fuel flow rate of said first fuel pump.

* * * * *